United States Patent Office.

SHELBY WADAN HELM, OF BACHALOR VALLEY, ASSIGNOR TO BRITTON CAPELL AND WILLIAM J. ROSE, OF LITTLE LAKE VALLEY, CALIFORNIA.

Letters Patent No. 112,595, dated March 14, 1871.

IMPROVEMENT IN MEDICAL COMPOUNDS FOR TREATING BRONCHIAL AND LUNG DISEASES.

The Schedule referred to in these Letters Patent and making part of the same.

*To all whom it may concern:*

Be it known that I, SHELBY WADAN HELM, of Bachalor Valley, in Lake county, in the State of California, have invented a new and useful preparation in the composition of matter, to wit: a new and useful Medicine for the relief, remedy, and cure of bronchial and lung diseases, asthma, phthisic, liver-complaint, and for purifying the blood, to be called and known as Helm's California Herb Bronchial and Lung Balsam; and I do hereby declare that the following is a full and exact description of the preparation, manufacture, and use of the same.

The nature of my invention and discovery consists in a new and useful medicine, manufactured and prepared from a composition and mixture of the essences of the bear bush, the golden seal of California, and the setoma root.

To enable others skilled in the art to make and use my invention, I will proceed to describe its preparation, manufacture, and use.

I take two pounds of the bear bush, one-quarter of a pound of the golden seal of California, and one-quarter of a pound of the setoma root, or in this proportion, avoirdupois weight; put these in one gallon of water and boil it until it is reduced to one-half gallon. I then strain it off, and after it is so strained off I then put into it one gallon of the best sugar-sirup and heat the new preparation until it is thoroughly mixed together. It is then prepared and ready for use, and is easily preserved in common bottles.

An average dose of this medicine is one tablespoonfull, which may be increased or diminished as the case may require, and should be taken from three to eight times a day.

What I claim as my invention, and desire to secure by Letters Patent, is—

The medicine hereinbefore described and set forth, under the name and title of Helm's California Herb Bronchial and Lung Balsam.

SHELBY WADAN HELM.

Witnesses:
 LEEMAN HAILE,
 J. B. LAMAR.